(12) United States Patent
Ting et al.

(10) Patent No.: US 6,198,340 B1
(45) Date of Patent: Mar. 6, 2001

(54) HIGH EFFICIENCY CMOS PUMP CIRCUIT

(75) Inventors: Tah-Kang Joseph Ting, Hsinchu; Gyh-Bin Wang, Chung-Li; Ming-Hung Wang, Hsinchu, all of (TW)

(73) Assignee: Etron Technology, Inc., Hsin-Chu (TW)

( * ) Notice: Subject to any disclaimer, the term of this patent is extended or adjusted under 35 U.S.C. 154(b) by 0 days.

(21) Appl. No.: 09/246,421

(22) Filed: Feb. 8, 1999

(51) Int. Cl.$^7$ .................................................. G05F 1/10
(52) U.S. Cl. ................................. 327/536; 327/390
(58) Field of Search ............................. 327/390, 536, 327/589, 383, 425, 404

(56) References Cited

U.S. PATENT DOCUMENTS

| | | | |
|---|---|---|---|
| 4,673,829 | 6/1987 | Gupta | 307/296 A |
| 5,134,317 | 7/1992 | Ohta | 307/482 |
| 5,222,042 | 6/1993 | Ichiguchi | 365/189.01 |
| 5,600,277 | * 2/1997 | Koelling | 327/526 |
| 5,748,032 | * 5/1998 | Baek | 327/536 |
| 5,933,047 | * 8/1999 | Zhu et al. | 327/536 |

OTHER PUBLICATIONS

Nakagome et al., "An Experimental 1.5–V 64–Mb DRAM," IEEE vol. 26, No. 4, 1991, pp. 465–471.

Favrat et al., "A High–Efficiency CMOS Voltage Doubler", IEEE, vol. 33, No. 3, 1998, pp. 410–416.

* cited by examiner

*Primary Examiner*—Jung Ho Kim
(74) *Attorney, Agent, or Firm*—George O. Saile; Stephen B. Ackerman

(57) ABSTRACT

In this invention a booster circuit is driven with two complimentary boost signals. The two boost signals produce two complimentary boosted signals that are connected to a pump circuit output by means of two pass gate circuits. The transistors in each pass gate are controlled such that one pass gate circuit conducts in a first half of a clock cycle and the second pass gate circuit conducts in a second half of a clock period. Each pass gate is driven such that the full boosted signal is transferred to the output of the pump circuit and is not diminished by a threshold voltage of the pass gate circuit. The efficiency of this design keeps the output capacitor charged to a value close to the average value of boosted signal.

12 Claims, 6 Drawing Sheets

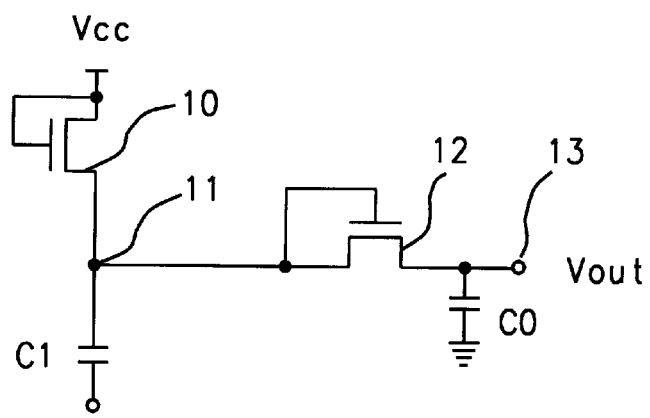
FIG. 1a – Prior Art
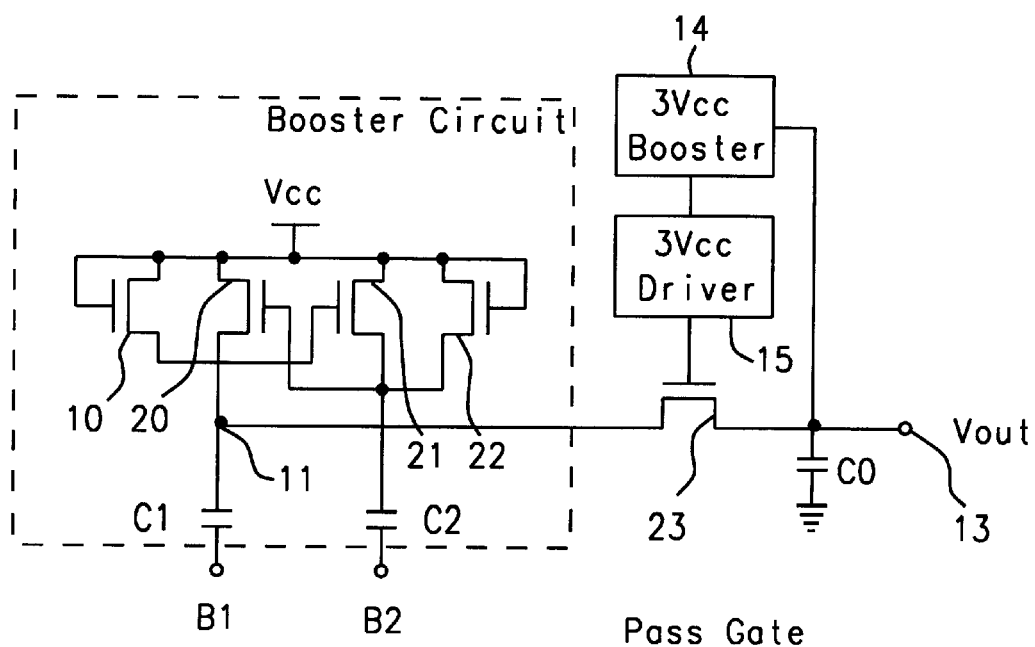
FIG. 1b – Prior Art

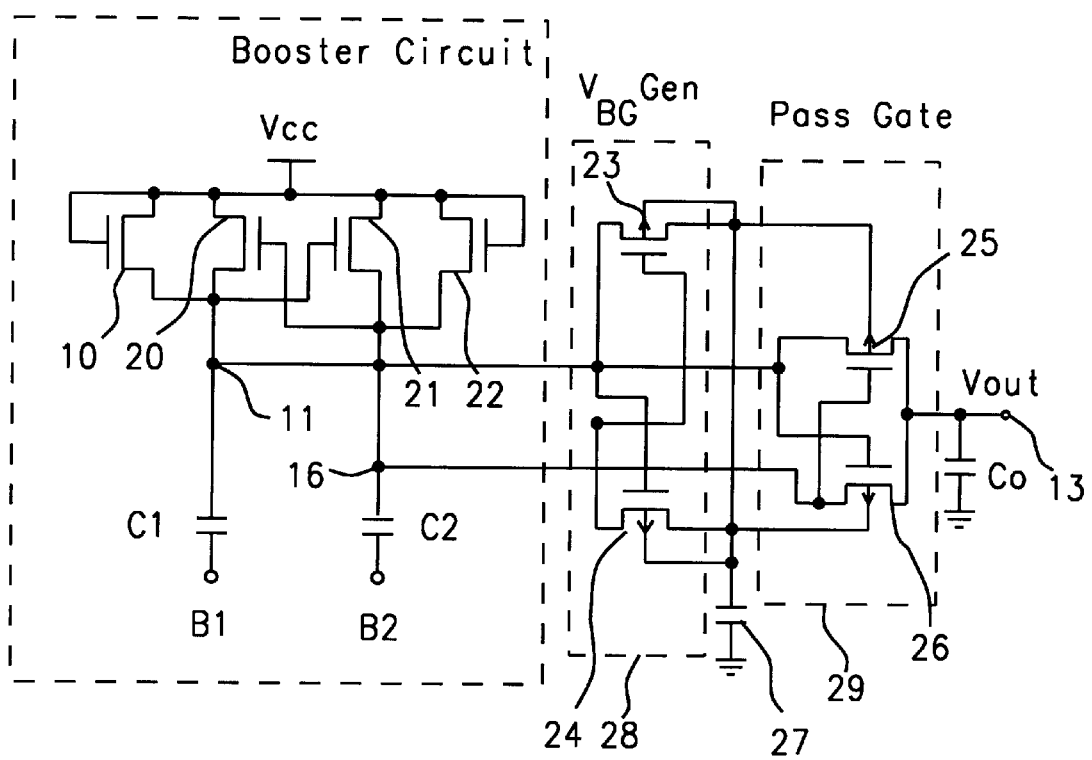
FIG. 1c - Prior Art

HIGH EFFICIENCY CMOS PUMP CIRCUIT

BACKGROUND OF THE INVENTION

1. Field of Invention

This invention relates to semiconductor integrated circuits and in particular to pump circuits used with semiconductor memory devices.

2. Description of Related Art

Pump circuits have become an important function in semiconductor memories for providing internal voltages higher than the voltage applied to the memory chip. The higher internal voltages created by pump circuits are used with specific functions that cannot be designed to operate at the lower chip voltage. This allows a low voltage to be applied to the chip for the use with most functions to lowers the power dissipation and allow higher levels of integration. One of the more critical applications of a pump circuit is to provide a bias voltage for word line drive circuits. The higher voltage for the wordline drive circuit is necessary to enhance the reading and writing current from the memory cell. The pump circuits generally in use include a booster circuit to produce the higher voltage and some form of a pass gate to connect the charge on capacitors of the booster circuit to an output load including an integrating capacitance to help smooth out the resulting voltage.

In U.S. Pat. No. 5,222,042 (Ichiguchi) a boost circuit for DRAM wordline is shown which boosts the wordline signal and minimizes the effect of capacitor leakage by using two boost circuits. In U.S. Pat. No. 5,134,317 (Otah) a charge pump circuit for a DRAM is disclosed in which the time to charge the boost capacitor is reduced. In U.S. Pat. No. 4,673,829 (Gupta) discloses a charge pump for use in programming a memory array that minimizes leakage current for unselected cells.

In "A High Efficiency CMOS Voltage Doubler" by Pierre Favrat, IEEE Journal of Solid State Circuits, Vol. 33, No. 3, March 1998, a voltage doubler is discussed using a charge pump cell and improved serial switches. An fully integrated charge pump is shown with an efficiency of seventy five percent whereas efficiencies of up to ninety five percent were attained using external capacitors. In "An Experimental 1.5-V 64-Mb DRAM" by Nakagome et al., IEEE Journal of Solid State Circuits, Vol. 26, No. 4, April 1991, low voltage circuit technologies for high density DRAM's is discussed including a wordline driver with charge pump circuit achieving a high boost ratio.

One of the problems with pump circuits is the threshold voltage of the pass gate transistor which reduces the amount of charge that can be transferred to the output of the pump circuit. A pass gate transistor that is not fully turned on has a high threshold voltage. Solving this problem can lead to driving the gate of the pass gate transistor to a high voltage, 3Vcc, and can lead to breakdown problems in the circuitry driving the gate of the pass gate transistor. Other approaches that try to eliminate the high gate voltage have difficulties keeping the pass gate transistors fully turned on and provide a low conductance for transferring charge to the output from a booster circuit. There is also a possibility of latch up because a well bias cannot be maintained to the highest voltage which potentially leads to a circuit latch up.

SUMMARY OF THE INVENTION

In this invention is disclosed an efficient pump circuit in which the maximum voltage is the output voltage plus a threshold voltage of the pass gate transistor. High conductance in the pass gate is provided by pairing an NMOS and a PMOS transistor to be on simultaneously in one half of a clock period and another NMOS and PMOS pair to be on simultaneously in the second half of the clock period. The two pairs of pass gate transistors have a low combined conductance allowing a shorter time period to transfer charge to an output capacitor. This allows the output capacitor voltage to raise more quickly and in turn permits a higher clock frequency as a result of the charging efficiency resulting from the low conductance of the pass gates.

The two pairs of transistors in the two pass gates are driven by two complimentary boosted voltages from a booster circuit that is driven by two complimentary booster signals. Each pass gate connects charge from the booster circuit to the output capacitor and is on during a different portion of the clock period. This configuration provides a very efficient pump circuit. The efficiency of the pump circuit is a measured by the ratio of the output current of the pump circuit compared to the total current required to produce a pump circuit output which includes the booster circuit, the boost voltages, any required external circuitry and any gate control of the pass gates.

The booster circuit comprises two cross coupled circuits each receiving a boost signal through coupling capacitors to produce a boosted signal that is twice the circuit bias Vcc. The two boost signals are clocked to be complimentary to each other and produce two complementary boosted signals. Each boosted signal is connected to the pump circuit output through a pass gate circuit. A first pass gate circuit is driven to be on full during the first half of a clock period and a second pass gate circuit is driven to be on full during the second half of a clock period.

The two pass gate circuits are each comprised of an N-channel and a P-channel transistor pair connected in parallel between the boosted signals and the output of the pump circuit. The gates of the transistor pair are driven separately, but the transistor pairs are driven such that both transistors of a pair are turned on and off together and provide a low conductance when turned on. The transistor pair of the first pass gate circuit is turned on in the first half of a clock period and are turned off in the second half of a clock period. The transistor pair of the second pass gate circuit is turned on in the second half of a clock period and are turned off in the first half of a clock period. The gate voltages connected to the N-channel and P-channel transistor pair in each pass gate circuit are controlled to be either zero volts or a voltage that is equal to the desired output voltage plus the threshold voltage of the N-channel pass gate transistors. Thus the transistors in the pass gate circuits are either off or fully turned on. The P-channel transistors in each pass gate circuit are placed into an N-well that is biased to the highest circuit voltage to prevent circuit latch up.

BRIEF DESCRIPTION OF THE DRAWINGS

This invention will be described with reference to the accompanying drawings, wherein:

FIGS. 1a, 1b and 1c are circuit diagrams of pump circuits of prior art;

DETAILED DESCRIPTION OF THE PREFERRED EMBODIMENT

Figure 2:
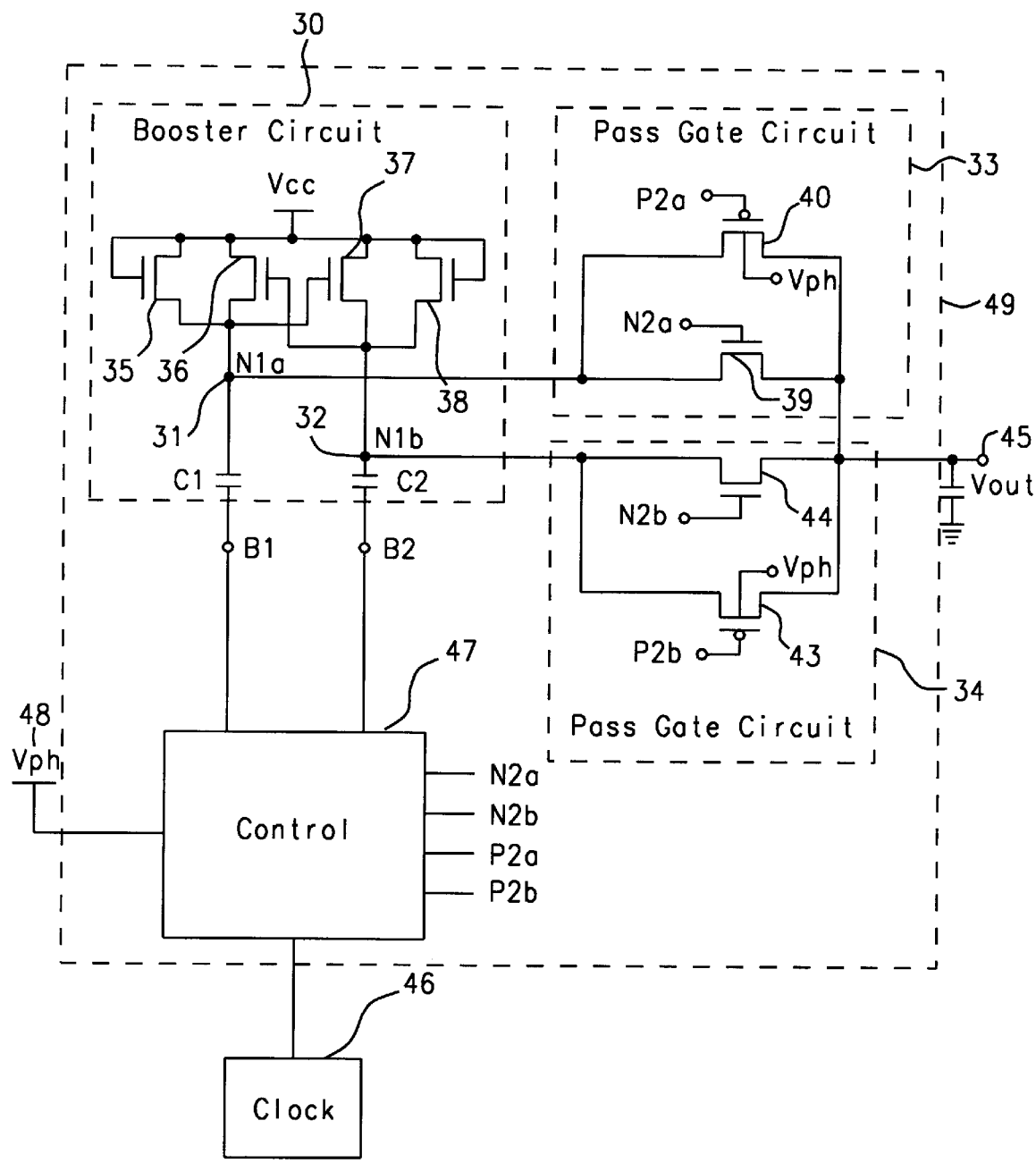
FIG. 2 is a circuit diagram of the pump circuit of this invention.

In FIG. 1a is shown a simple pump circuit of prior art. A booster circuit is shown consisting of an N-channel transistor 10 with its gate and drain connected together to Vcc and a capacitor C1 that is driven by a boost signal B1. The boosted voltage on node 11 is connected to Vout 13 by an N-channel transistor 12 acting as a diode. Connected to Vout 13 is a capacitor Co to store charge from the boosted voltage on node 11. Vout 13 is affected by the threshold voltages of both transistor 10 and transistor 12 which reduces the efficiency of the pump circuit.

In FIG. 1b a more elaborate pump circuit is shown. A first voltage boosting circuit is made by connecting transistor 10 in parallel to a second transistor 20. The gate of the second transistor 20 is driven by a second boost signal B2 through a second capacitor C2. A second signal boosting circuit consisting of two transistors 21 and 22 connected in parallel between Vcc and capacitor C2 similar to the first signal boosting circuit. The gate of transistor 21 is driven by a first boost signal B1 through a first capacitor C1. A feedback circuit caused by the cross coupling of transistors 20 and 21 drives the transistors 20 and 21 on full eliminating the effects of threshold voltage of transistors 20 and 21 on the boosted voltage on node 11. Transistor 23 forms a pass gate that connects the DC component of the boosted voltage to Vout 13 and the output capacitor Co. A 3Vcc booster circuit 14 is used to drive a 3 Vcc driver 15 which is connected to the gate of the pass gate transistor 23 to produce an output voltage Vout 13 that is approximately 2Vcc. The high voltage of the 3 Vcc booster 14 and the 3Vcc driver 15 provide a potential for circuit breakdown in the booster 14 and the driver 15 circuits.

In FIG. 1c is shown a pump circuit which produces an output 13 without the use of a 3Vcc pump voltage. A booster circuit similar to that of FIG. 1b is shown with the exception that a boosted signal from circuit node 16 is connected to the pass gate 29 along with the boosted signal from circuit node 11. The two boosted signals 11 and 16 have an complimentary ac component caused by the booster signals B1 and B2 that are used to bias a $V_{BG}$ generator 28 and a pass gate 29. The two transistors 23 and 24 of the $V_{BG}$ generator are used to establish a voltage to bias the N-well used in support of the P-channel transistors 23, 24, 25 and 26. The voltage from node 11 connected to the source of transistor 25 is initially boosted to almost twice the Vcc level as the voltage from node 16 connected to the gate of transistor 25 is initially pulled down to almost the Vss level. This fully turns on the pass gate transistor 25. Soon after the initial voltages on the source and gate of transistor 25 have occurred, the charge of C1 begins to be shared with Co through transistor 25, and C2 begins to be precharged to the Vcc level by transistors 10 and 20. The gate voltage on transistor 25 from circuit node 16 begins to increase while the source voltage from circuit node 11 begins to decrease which tends to keep transistor 25 from being fully turned on, lowers the conductance of transistor 25 and takes longer to charge Co. A similar scenario applies to transistor 26, and causes a loss in efficiency of the pump circuit.

In FIG. 2 is shown a schematic of the Vpp pump circuit 49 of this invention. A clock circuit 46 provides timings for control logic 47 that produces a number of control signals N2a, N2b, P2a and P2b. The booster circuit 30 is similar to that of the prior art of FIG. 1c where two boosted signals are used to connect to pass gate transistors. Boosted signal N1a on node 31 and boosted signal N1b on node 32, are connected to two separate pass gate circuits 33 and 34, and both. N1a and N1b have a maximum voltage value that is approximately twice Vcc. The booster circuit is constructed of transistors 35, 36, 37 and 38 and capacitors C1 and C2. A booster signal B1 is applied to capacitor C1 and through to the sources of transistors 35 and 36. The booster signal B1 is a clocked pulse with a minimum voltage of zero volts and a maximum voltage of approximately Vcc with a duty cycle of approximately fifty percent. In like manner booster signal B2 is applied to capacitor C2 and through to the sources of transistors 37 and 38. The booster signal B2 is a clocked pulse with a minimum voltage of zero volts and a maximum voltage of approximately Vcc with a duty cycle of approximately fifty percent and is complimentary to booster signal B1.

Continuing to refer to FIG. 2, transistors 36 and 37 are cross coupled to provide feedback to each other and to eliminate the effects of transistor threshold voltage from affecting the amplitude of the boosted voltage on nodes 31 and 32. The gate of transistor 36 is connected to the source of transistor 37 and node 32, and the gate of transistor 37 is connected to the source of transistor 36 and node 31. Thus the gate of transistor 36 is driven by the boosted signal N1b on node 32, and the gate of transistor 37 is driven by the boosted signal N1a on node 31. When boosted signal N1b is high, boosted signal N1a is low and transistor 36 is driven on full to bring boosted signal on node 31 to voltage level approximately equal to Vcc. Shortly after the voltage on node 31 reaches a voltage of approximately Vcc, booster signal B1 goes high raising the voltage N1a on node 31 to a value approximately equal to 2Vcc and turning off transistor 36. Then booster signal B1 drives N1a on node 31 high, boosted signal N1b is low and transistor 37 is driven on full to bring boosted signal on node 32 to a voltage level approximately equal to Vcc. Shortly after the voltage on node 32 reaches a voltage of approximately Vcc, booster signal B2 goes high raising the voltage N1b on node 32 to a value approximately equal to 2Vcc and turning off transistor 37.

Continuing to refer to FIG. 2, the boosted signal N1a on node 31 is connected to pass gate circuit 33, and the boosted signal on node 32 is connected to pass gate circuit 34. Both pass gate circuits 33 34 are connected to Vout, the pump circuit output, and capacitor C3. Pass gate circuit 33 comprises transistors 39 and 40, each of which connects the signal on node 31 to Vout 45. Transistor 39 of pass gate circuit 33 is an N-channel transistor whose gate is driven with a N2a where N2a=Vph=Vpm+Vth, Vpm=maximum amplitude of Vout and Vth=threshold voltage of the N-channel transistor 39. Transistor 40 is a P-channel transistor in an N-well whose gate is driven by a signal P2a where, P2a=Vph=Vpm+Vth. The N-well of transistor 40 is biased to Vph, a voltage equal to the maximum amplitude of Vout plus the transistor threshold voltage to prevent any circuit latch up problems.

Continuing to refer to FIG. 2, pass gate circuit 34 comprises transistors 43 and 44 each of which connects the boosted signal N1b on node 32 to Vout 45. Transistor 44 of pass gate circuit 34 is an N-channel transistor whose gate is driven with a pass gate circuit signal N2b where, N2b=Vph=Vpm+Vth. Transistor 43 is a P-channel transistor in an N-well whose gate is driven with a pass gate circuit signal P2b where, P2b=Vph=Vpm+Vth. The N-well of transistor 43 is biased to Vph, a voltage equal to the maximum amplitude of Vout plus the transistor threshold voltage to prevent circuit latch up problems.

Figure 3:
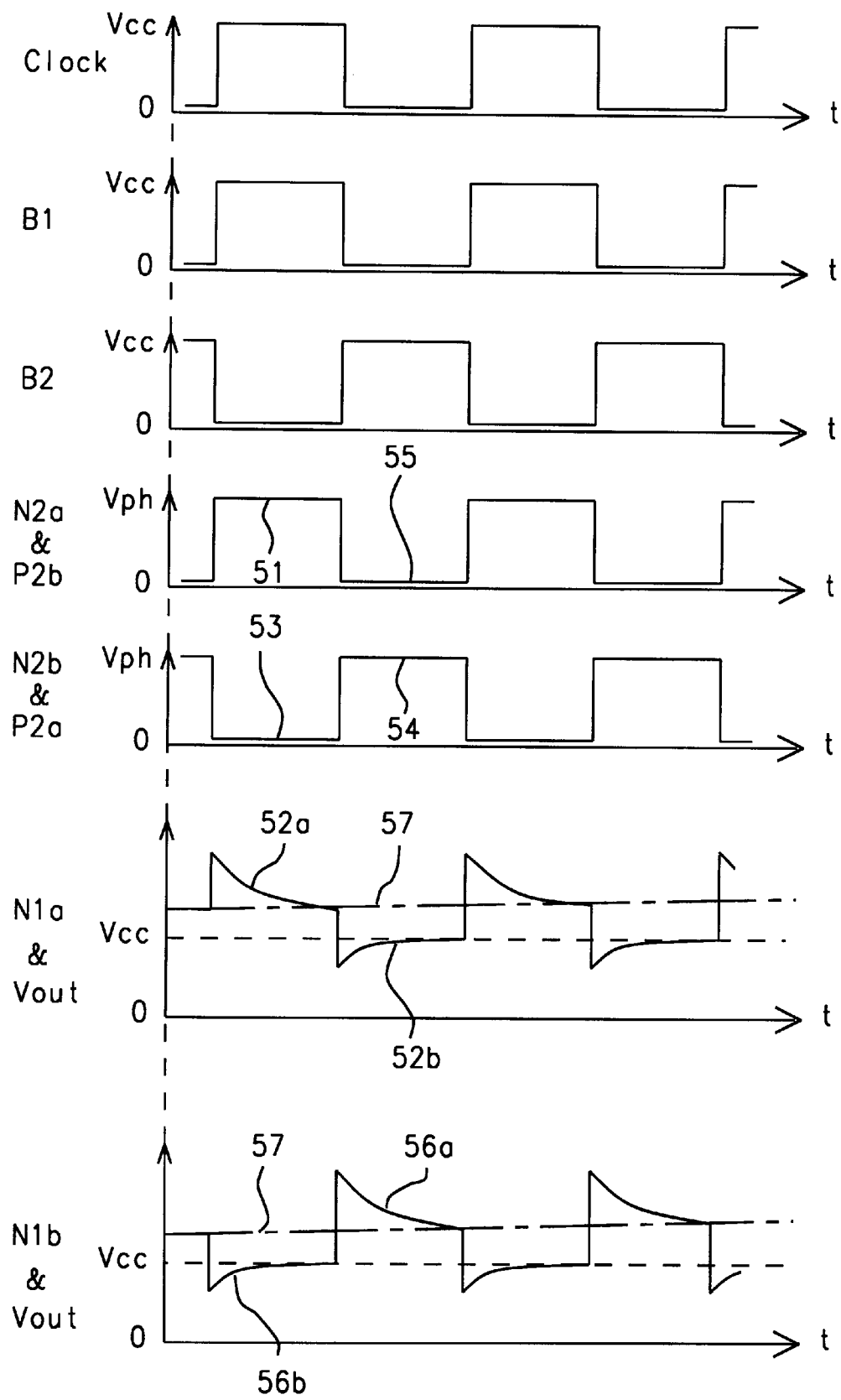
FIG. 3 is a graph showing waveforms of the pump circuit of this invention.

Continuing to refer to FIG. 2 and looking at the voltage waveforms in FIG. 3, the timing control and amplitude of gate signals N2a, N2b, P2a and P2b are such that transistors 39 and 40 of pass gate circuit 33 are both turned on full during one half of a clock period and Transistors 44 and 43 of pass gate circuit 34 are both turned on full during the other half of a clock period. The gate control signals N2a, N2b, P2a and P2b have a voltage that is either Vph or 0 volts to insure that the pass gate transistors provide an high conductance. Whereas the preferred embodiment of this invention uses an N-channel transistor and a P-channel transistor in the pass gates 33 and 34, any number of transistors of either type could be used to provide high conductance to connect the boosted signals N1a and N1b to the output 45. For example a single N-channel transistor or a single P-channel transistor could be used. If higher conductance were required, two or more N-channel or P-channel transistors could be used.

Referring to FIG. 3, a set of waveforms for this invention is shown. Boost signals B1 and B2 are clocked to be complimentary to each other and have a pulse voltage from zero volts to Vcc. Boost signal B1 drives node 31 to produce a voltage N1a 52a and 52b. When boost signal B1 is high, N1a 52a is a positive voltage greater than Vcc, and charge is shared with the output capacitor C3 through pass gate circuit 33 producing a pump circuit output 45 with a raising voltage shown in FIG. 3 as Vout 57. This positive raise in Vout 57 continues until the target voltage has been reached at which time the pump circuit will stop pumping current to the output capacitor C3. When the boost signal B1 is low, the pass gate circuit 33 is off and node 31 is precharged to N1a=Vcc 52b Continuing to refer to FIG. 3, boost signal B2 drives node 32 to produce a voltage N1b 56a and 56b. When boost signal B2 is high, N1b 56a is a positive voltage greater than Vcc, and charge is shared with the output capacitor C3 through pass gate circuit 34 producing a pump circuit output 45 with a raising voltage shown in FIG. 3 as Vout 57. This positive raise in Vout 57 continues until the target voltage has been reached at which time the pump circuit will stop pumping current to the output capacitor C3. When the boost signal B2 is low, the pass gate circuit 34 is off and node 32 is precharged to N1b=Vcc 56b.

Continuing to refer to FIG. 3 along with FIG. 2, the node voltages N1a and N1b are connected to the pump circuit output 45 by the pass gate circuits 33 and 34 under the control of pass gate control signals N2a, N2b, P2a, and P2b connected to the gates of the pass gate transistors 39,40,43 and 44. When N2a=Vph 51 and P2a=0V 53, the N-channel transistor 39 and the P-channel transistor 40 of pass gate 33 both conduct producing a high conductance and connecting current from node 31, N1a 52a, to the output capacitor C3 to produce output voltage Vout 57. When N2a=0V 55 and P2a=Vph 54, the N-channel transistor 39 and the P channel transistor 40 of pass gate 33 are both turned off and the voltage, N1a, on node 31 charges to Vcc 52b. When N2b=Vph 54 and P2b=0V 55, the N-channel transistor 44 and the P-channel transistor 43 of pass gate 34 both conduct producing a high conductance and connecting current from node 32, N1b 56a, to the output capacitor C3 to produce output voltage Vout 57. When N2b=0V 55 and P2b=Vph 54, the N-channel transistor 44 and the P channel transistor 43 of pass gate 34 are both turned off, and the voltage, N1b, on node 32 charges to Vcc 56b.

Continuing to refer to FIG. 3, the N-channel transistor 39 of pass gate 33 is turned on when the gate signal N2a is high at a value of Vph 51, and N1a connected to the source of transistor 39 is also high 52a. The P-channel transistor 40 of pass gate 33 is turned on when the gate signal P2a is at a low voltage of zero volts 53 and N1a connected to the source of transistor 40 is high 52a. The N-channel transistor 44 of pass gate 34 is turned on when the gate signal N2b is high at a value of Vph 54 and N1b connected to the source of transistor 44 is also high 56a. The P-channel transistor 43 of pass gate 34 is turned on when the gate signal P2b is at a low voltage of zero volts 55 and N1b connected to the source of transistor 43 is high 56a.

Figure 4:
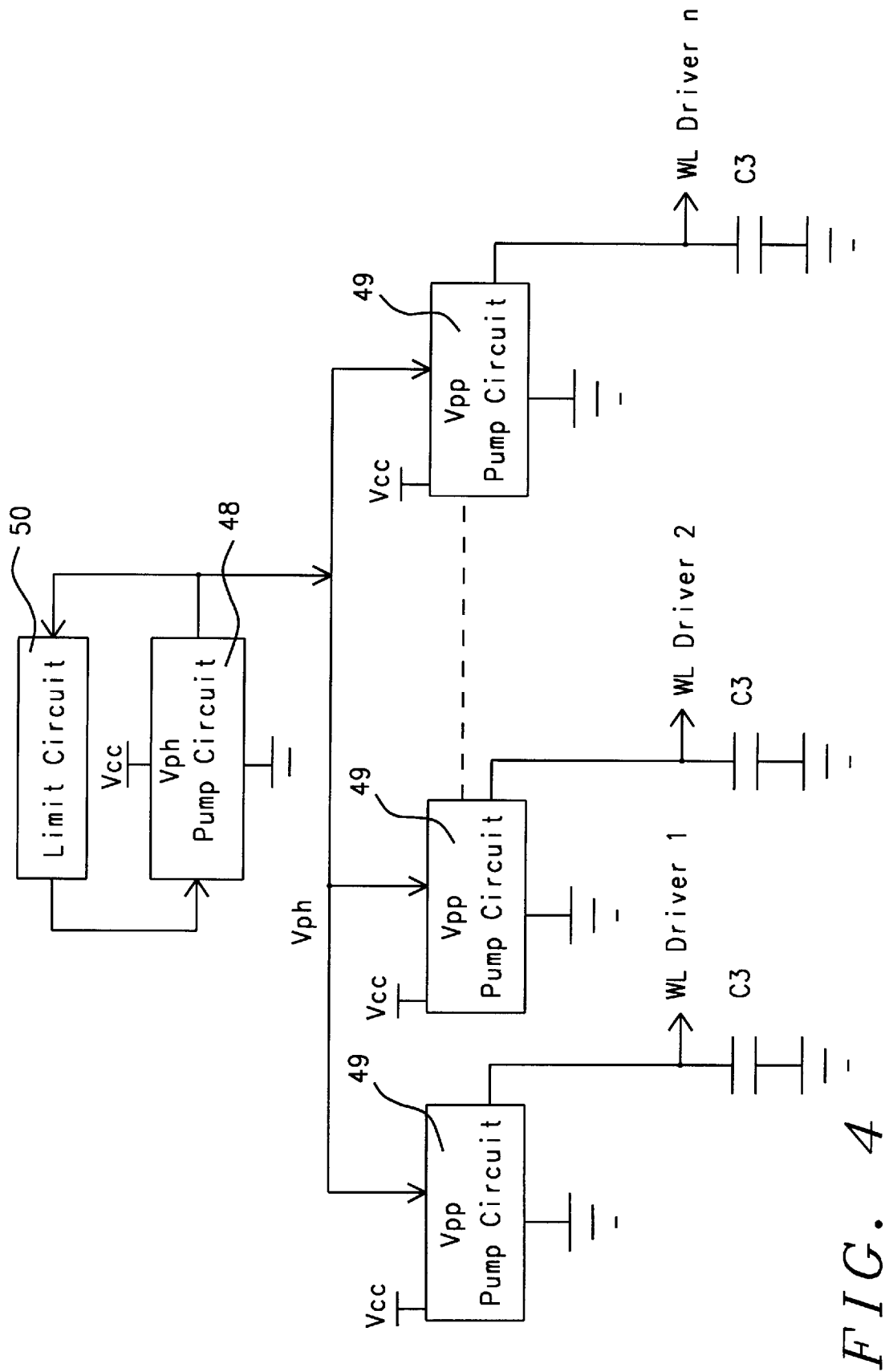
FIG. 4 is a block diagram showing the connection of the pump circuit of this invention to wordline drivers.

In FIG. 4 a plurality Vpp pump circuits 49 of this invention are shown connected to a plurality of word line drivers. The Vpp pump circuits provide a high voltage to the drivers of approximately 2Vcc to permit the design and operation of a semiconductor memory with appropriate noise margins. Connected to the Vpp pump circuits is a Vph pump circuit 48 used to provide a bias for the Vpp pump circuits 49. The output of the Vph pump circuit produces a voltage Vph=Vout+Vth, where Vout is approximately 2Vcc and the output voltage of the Vpp pump circuit 49, and Vth is the threshold voltage of the N-channel transistors 39 and 44 of the pass gates 33 and 34 shown in FIG. 2. The output voltage of the Vph pump circuit 48 keeps the N-channel transistors in the pass gates 33 and 34 of the Vpp pump circuit turned on fully and provides bias to the N-well of the P-channel transistors 40 and 43 to prevent circuit latch up. A limit circuit 50 is connected to the Vph pump circuit 48. The limit circuit detects 50 the voltage at the output of the Vph pump circuit 48. If the output voltage of the Vph pump circuit 48 is smaller than Vph, the limit circuit 50 turns on to enable the Vph pump circuit 48, otherwise the Vph pimp circuit is controlled to be off.

Continuing to refer to FIG. 4, the Vpp pump circuits 49 are high efficient circuits each producing an output voltage Vout=Vpp that is approximately twice Vcc and is connected to provide power to the word line drivers of a memory array. The circuit configuration shown in FIG. 4 provides the necessary voltage biasing for multiple wordline drivers and requiring only one high voltage Vph pump circuit 48. A plurality of efficient Vpp pump circuits 49 use the output from the Vph pump circuit 48 to produce a voltage to bias a plurality of wordline drivers.

Figure 5:
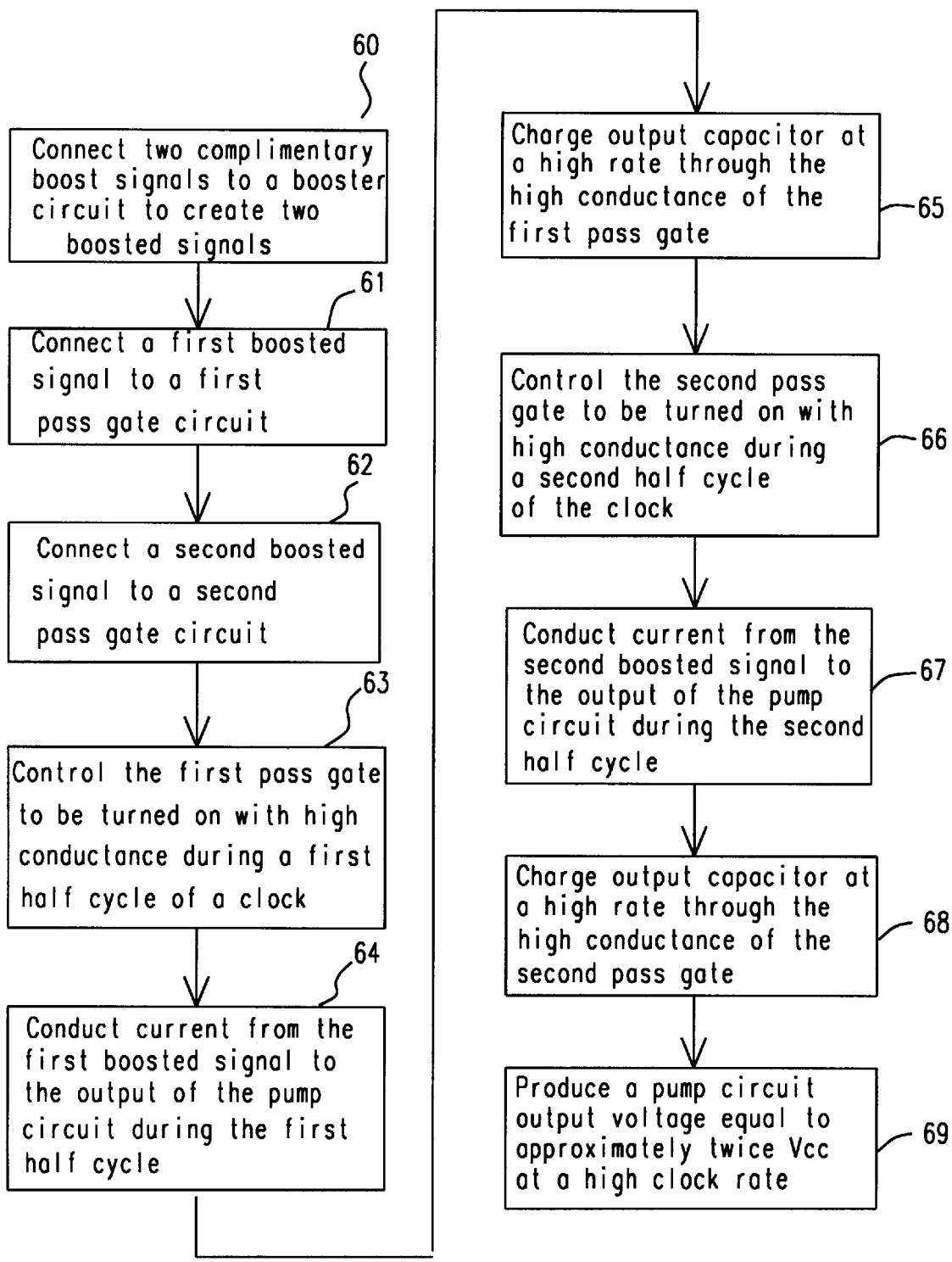
FIG. 5 is a flow diagram demonstrating the method of boosting a voltage using the pump circuit of this invention.

Referring to FIG. 5, a flow diagram of the method to produce an efficient, high pumped voltage is shown. Two logically complimentary booster signals are connected to a booster circuit 60 to create two complimentary boosted signals. A first boosted signal is connected to a first pass gate circuit 61. A second boosted signal is connected to a second pass gate circuit 62. The first pass gate is controlled to be turned on full during the first half cycle of a clock 63, producing a high conductance. Current is conducted from the first boosted signal through the first pass gate to the output of the pump circuit during the first half cycle of the clock 64, allowing the charging of the output capacitor at a high clock rate through the high conductance of the first pass gate 65. The second pass gate is controlled to be turned on full during the second half cycle of the clock 66, producing a high conductance. Current is conducted from the second boosted signal through the second pass gate to the output of the pump circuit during the second half cycle of the clock 67. This allows the charging of the output capacitor at a high clock rate through the high conductance of the second pass gate 68, and produces a pump circuit output voltage that is approximately twice Vcc at a high clock rate 69.

While the invention has been particularly shown and described with reference to preferred embodiments thereof, it will be understood by those skilled in the art that various changes in form and details may be made without departing from the spirit and scope of the invention.

What is claimed is:

1. A voltage pump circuit, comprising:
   a) a clock with a first half clock period and a second half clock period controlling a booster circuit,
   b) said booster circuit driven by two clocked boost signals to produce a first boosted voltage during said first half clock period and a second boosted voltage during said second half clock period,
   c) said first boosted voltage connected to a first plurality of pass gate transistors comprising at least one N-channel transistor and one P-channel transistor connected in parallel between said first boosted voltage and pump circuit output,
   d) said second boosted voltage connected to a second plurality of pass gate transistors comprising at least one N-channel transistor and one P-channel transistor connected in parallel between said second boosted voltage and pump circuit output,
   e) said first plurality of pass gate transistors controlled to produce a high conductance during said first half clock period to conduct charge current from said first boosted voltage to output of pump circuit,
   f) said second plurality of pass gate transistors controlled to produce a high conductance during said second half clock period to conduct charge current from said second boosted voltages to said output of said pump circuit.

2. The voltage pump circuit of claim 1, wherein gate voltages of said pass gate transistors are controlled to be equal to a maximum output voltage of said pump circuit plus a threshold voltage of said pass gate transistors to fully turn on said pass gate transistors.

3. A voltage pump circuit, comprising:
   a) a clock with a first half clock period and a second half clock period controlling a booster circuit,
   b) said booster circuit driven by two clocked boost signals to produce a first boosted voltage during said first half clock period and a second boosted voltage during said second half clock period,
   c) said first boosted voltage connected to a first plurality of pass gate transistors,
   d) said second boosted voltage connected to a second plurality of pass gate transistors,
   e) said first plurality of pass gate transistors controlled to produce a high conductance during said first half clock period to conduct charge current from said first boosted voltage to output of pump circuit,
   f) said second plurality of pass gate transistors controlled to produce a high conductance during said second half clock period to conduct charge current from said second boosted voltages to said output of said pump circuit,
   g) said first and second plurality of pass gate transistors comprise of NMOS and PMOS transistors connected in parallel to produce high conductance when fully turned on to permit current from boosted voltages to be efficiently connected to said output of said pump circuit.

4. A voltage pump circuit, comprising:
   a) a clock with a first half clock period and a second half clock period controlling a booster circuit,
   b) said booster circuit driven by two clocked boost signals to produce a first boosted voltage during said first half clock period and a second boosted voltage during said second half clock period,
   c) said first boosted voltage connected to a first plurality of pass gate transistors,
   d) said second boosted voltage connected to a second plurality of pass gate transistors,
   e) said first plurality of pass gate transistors controlled to produce a high conductance during said first half clock period to conduct charge current from said first boosted voltage to output of pump circuit,
   f) said second plurality of pass gate transistors controlled to produce a high conductance during said second half clock period to conduct charge current from said second boosted voltages to said output of said pump circuit,
   g) said first and second plurality of pass gate transistors comprise of NMOS and PMOS transistors connected in parallel to produce high conductance when fully turned on to permit current from boosted voltages to be efficiently connected to said output of said pump circuit,
   h) said PMOS transistor is in an N-well which is biased to a voltage higher than pump circuit output to prevent a circuit latch up.

5. The voltage pump circuit of claim 1, wherein said output voltage of said pump circuit is approximately twice booster circuit bias voltage.

6. A CMOS pump circuit, comprising:
   a) a booster circuit connected to two pass gate circuits,
   b) said booster circuit driven by two complimentary boost signals,
   c) said complimentary boost signals producing two complimentary boosted signals,
   d) a first boosted signal of said two complimentary boosted signals connected to a first pass gate circuit comprising at least one N-channel transistor and one P-channel transistor connected in parallel between said booster circuit and pump circuit output,
   e) a second boosted signal of said two complimentary boosted signals connected to a second pass gate comprising at least one N-channel transistor and one P-channel transistor connected in parallel between said booster circuit and pump circuit output,
   f) said first and said second pass gate circuits controlled to connect said first and said second boosted signal to pump circuit output to produce an output voltage that is greater than bias voltage of said booster circuit.

7. The CMOS pump circuit of claim 6, wherein said first and said second pass gate circuits are controlled to compensate for threshold voltage of pass gate transistors and to fully turn on said pass gate transistors.

8. A CMOS pump circuit, comprising:
   a) a booster circuit connected to two pass gate circuits,
   b) said booster circuit driven by two complimentary boost signals,
   c) said complimentary boost signals producing two complimentary boosted signals,
   d) a first boosted signal of said two complimentary boosted signals connected to a first pass gate circuit of said two pass gate circuits,
   e) a second boosted signal of said two complimentary boosted signals connected to a second pass gate circuit of said two pass gate circuits,
   f) said first and said second pass gate circuits controlled to connect said first and said second boosted signal to pump circuit output to produce an output voltage that is greater than bias voltage of said booster circuit, g) said first and said second pass gate circuits are comprised of an NMOS and a PMOS transistor connected in parallel and separately controlled to produce a high conductance pass gate.

9. The CMOS pump circuit of claim 6, wherein said output voltage is about twice an amplitude of the bias voltage for said booster circuit.

10. A method for boosting a voltage, comprising:
   a) connecting two complimentary boost signals to a booster circuit of a voltage pump circuit,
   b) connecting a first boosted signal from said booster circuit to an N-channel and a P-channel connected in parallel transistor of a first pass gate circuit,
   c) connecting a second boosted signal from said booster circuit to an N-channel and a P-channel connected in parallel transistor of a second pass gate circuit,
   d) controlling said first pass gate circuit to be turned on with high conductance during a first half cycle of a clock,
   e) conducting current from a first boosted signal to output of said pump circuit during said first half cycle of said clock,
   f) charging a capacitor connected to said output of said pump circuit at a high rate through the high conductance of said first pass gate circuit,
   g) controlling said second pass gate circuit to be turned on with high conductance during a second half cycle of a clock,
   h) conducting current from a second boosted signal to said output of said pump circuit during said second half cycle of said clock,
   i) charging said capacitor connected to said output of said pump circuit at a high rate through the high conductance of said second pass gate circuit,
   j) producing a pump circuit output voltage that is higher than booster circuit bias voltage.

11. The method of claim 10, wherein controlling said first and second pass gate circuits connects a voltage to each gate of said N-channel and said P-channel transistors of said first and second pass gate circuits that is approximately equal to said output voltage plus a threshold voltage of said transistors.

12. The method of claim 10, wherein conducting current from the first boosted signal and the second boosted signal is done by controlling said N-channel and said P-channel transistors in said first pass gate circuit to conduct simultaneously to produce a high conductance in said first half cycle of said clock, and by controlling said N-channel and said P-channel transistors in said second pass gate circuit to conduct simultaneously to produce a high conductance in said second half cycle of said clock.

* * * * *